(12) United States Patent
Himuro

(10) Patent No.: US 6,907,909 B2
(45) Date of Patent: Jun. 21, 2005

(54) PNEUMATIC TIRE INCLUDING PSEUDO-LAND PART

(75) Inventor: Yasuo Himuro, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 124 days.

(21) Appl. No.: 09/971,730

(22) Filed: Oct. 9, 2001

(65) Prior Publication Data

US 2002/0062892 A1 May 30, 2002

(30) Foreign Application Priority Data

Oct. 10, 2000 (JP) ........................................ 2000-308846

(51) Int. Cl.$^7$ ...................... B60C 11/13; B60C 101/00; B60C 103/00; B60C 115/00
(52) U.S. Cl. ............................ 152/209.15; 152/209.24; 152/209.27; 152/209.28
(58) Field of Search ....................... 152/209.15, 209.24, 152/209.28, 209.18, 209.27

(56) References Cited

U.S. PATENT DOCUMENTS 4,690,189 A * 9/1987 Bradisse et al. ........ 152/209.15
5,885,384 A * 3/1999 Himuro
6,340,040 B1 * 1/2002 Ikeda
6,343,636 B1 * 2/2002 Hanya et al.

FOREIGN PATENT DOCUMENTS

| EP | 1075971 | * | 2/2001 |
| GB | 1549347 | * | 8/1979 |
| JP | 2-179508 | * | 7/1990 |
| JP | 6-270609 | * | 9/1994 |
| JP | 10-016515 A | | 1/1998 |
| JP | 2000-43514 | * | 2/2000 |
| WO | WO 00/51831 A1 | | 9/2000 |

OTHER PUBLICATIONS

Abstract for WO 2000/51831.*

* cited by examiner

*Primary Examiner*—Steven D. Maki
(74) *Attorney, Agent, or Firm*—Sughrue Mion, PLLC

(57) ABSTRACT

A pneumatic tire comprises a tread portion having a plurality of slant grooves, in which each slant groove has a steeply slant groove portion and a gently slant groove portion, and the steeply slant groove portion comprises a pseudo-land part of a given shape, and can improve a drainage performance without sacrificing the other tire performances.

16 Claims, 5 Drawing Sheets

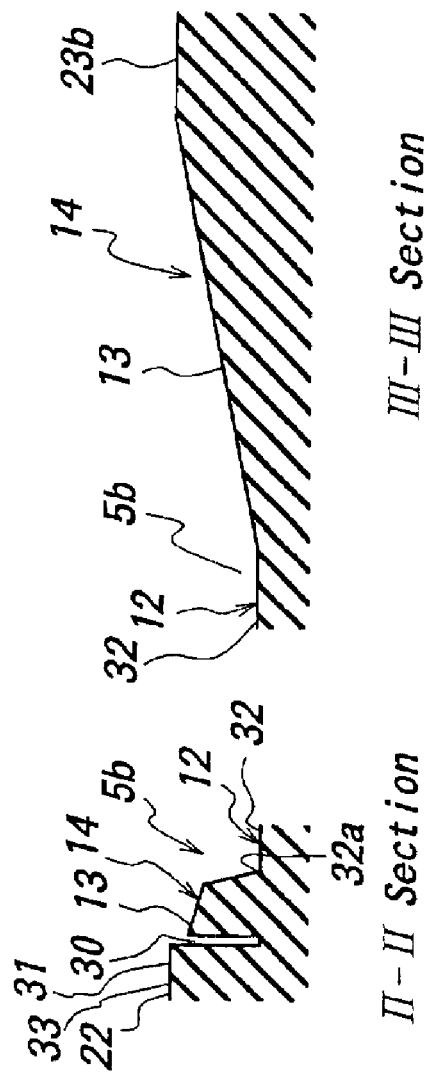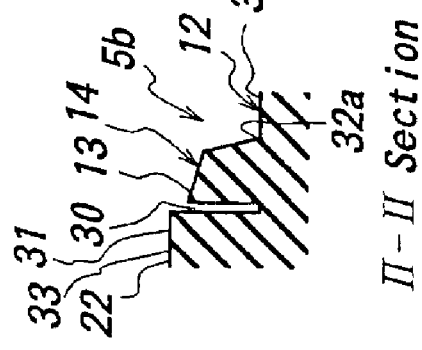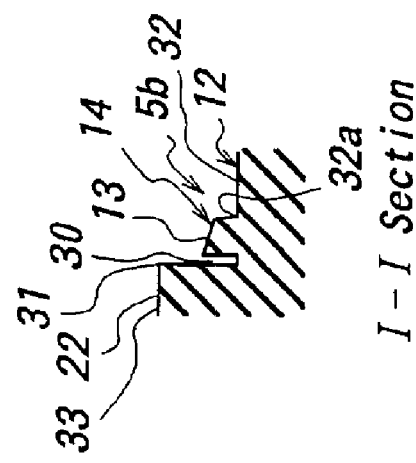

I-I Section

II-II Section

III-III Section

IV-IV Section

PNEUMATIC TIRE INCLUDING PSEUDO-LAND PART

BACKGROUND OF THE INVENTION

1. Field of the Invention

This invention relates to a pneumatic tire improving a drainage performance without sacrificing the other tire performances such as a steering stability and the like, and more particularly to a so-called high-performance tire having a small aspect ratio and a wide tread width.

2. Description of Related Art

In the conventional pneumatic tire, for example, the tire for use in a passenger car, as shown in FIG. 5, it is general to have a tread pattern defined by arranging circumferential grooves 101–103 extending in parallel to an equatorial plane of the tire, and a plurality of slant grooves 104–106 opening to the circumferential groove 101, 102, extending from the circumferential groove 101, 102 toward each end of the tread, and obliquely extending to the equatorial plane of the tire.

In such a tread pattern, an excellent drainage performance can be given to the tire by mainly performing the drainage toward the longitudinal direction of the tire through the circumferential grooves and performing the drainage toward the lateral direction of the tire through the slant grooves.

In the tire having such a tread pattern, as means for further improving the drainage performance, it is useful to make larger a ratio of groove area or so-called negative ratio by enlarging the groove width and the like, or to arrange the slant grooves at a small angle with respect to the circumferential direction of the tire or form so-called high-angle grooves.

However, the increase of the negative ratio becomes lacking in the rigidity of the land in the tread portion, and also when the slant grooves are arranged as the high-angle groove, a corner part of the land defined by the slant grooves becomes acute and hence the rigidity of each land is lacking. In any case, the sufficient steering stability can not be obtained.

Moreover, as a construction of the tread pattern for balancedly satisfying both the drainage performance and the steering stability, it is useful to combine the circumferential grooves with the slant grooves as a basic construction and also to change the extending shape of the slant groove between a central region and a side region of the tread portion. Concretely, a portion of the slant groove located in the central region is formed as a steeply slant groove portion inclined at a small angle with respect to the circumferential direction of the tire and a portion of the slant groove located in the side region is formed as a gently slant groove portion inclined at a large angle with respect to the circumferential direction of the tire.

With respect to the tire having such a tread pattern that the drainage performance and the steering stability are balancedly satisfied, the inventor has made examinations for more improving the drainage performance and confirmed that when water existing in the central region of the tread in the tire contacting with ground is particularly taken into the slant groove and discharged therefrom toward the lateral direction of the tire, the water taken into the slant groove collides with a groove wall of a curved groove portion passing during the movement from the steeply slant groove portion to the gently slant groove portion to thereby easily cause disturbance of the water flow and such a disturbance largely lowers the drainage ability of the slant groove toward the lateral direction of the tire.

SUMMARY OF THE INVENTION

It is, therefore, an object of the invention to provide a pneumatic tire, particularly a high-performance tire improving the drainage performance without sacrificing the other tire performances such as steering stability and the like by adopting a tread pattern provided with slant grooves each comprising a steeply slant groove portion and a gently slant groove portion as a basic construction and arranging a pseudo-land portion at a given position in the steeply slant groove portion of the slant groove.

According to the invention, there is the provision of in a pneumatic tire comprising a tread portion with a tread pattern defined by a plurality of slant grooves, each of which slant grooves comprising a steeply slant groove portion located in a widthwise central region of the tread portion, (steeply slant groove portion) inclined at a relatively small angle with respect to a circumferential direction of the tire, and (steeply slant groove portion) extending from a top that is one end of steeply slant groove portion which is close to an equatorial plane of the tire toward an end that is the other end of steeply slant groove portion which is close to a tread end, and a gently slant groove portion located in each of both side regions of the tread portion, (gently slant groove portion) inclined at a relatively large angle with respect to the circumferential direction of the tire, and (gently slant groove portion) extending from the end of the steeply slant groove portion or an extension thereof so as to open at the tread end, the improvement wherein an opening groove width (W1) located at the end of the steeply slant groove portion is wider than an opening groove width (W2) located at the top of the steeply slant groove portion, and the steeply slant groove portion extending in a longitudinal direction of the slant groove comprises a groove edge part forming a boundary to an outer surface of a tread land portion, a main groove bottom part mainly forming a groove bottom of the steeply slant groove portion, and a pseudo-land part located in the groove edge part and adjacent to at least one of both side edges of the main groove bottom part, and the pseudo-land part has such a slant surface that a height thereof is gradually decreased from the groove edge part toward the main groove bottom part.

And also, when it is required to compensate for the rigidity of the land portion while smoothly flowing water from the steeply slant groove portion to the gently slant groove portion, the slant surface of the pseudo-land part is preferable to have substantially a triangular or trapezoidal and flat or curved surface shape when viewing the tire from a front thereof.

Furthermore, when it is required to reduce a pattern noise, a pair of adjoining slant grooves located on both sides of a pattern center are preferable to be formed at a phase difference of a half pitch in the circumferential direction of the tire.

Moreover, when the drainage performance is particularly attached importance, it is preferable to arrange one circumferential main groove extending along the circumferential direction of the tire in a widthwise central position of each half tread zone sandwiched between the pattern center and both the tread ends or in the vicinity of the central position of the half tread zone.

In addition, when sufficient drainage performance and steering stability are balancedly satisfied, it is preferable to form at least one rib-shaped land portion extending along the circumferential direction of the tire and at least two land rows each comprised of plural blocks in the tread portion.

In case of mainly aiming at the improvement of the drainage performance, the pseudo-land part is preferable to be arranged adjacent to a side edge of the main groove bottom part located at the pattern-center-side of the main groove bottom part in the steeply slant groove portion. If it is required to compensate for the rigidity of both land portions divided by the steeply slant groove portion, the pseudo-land parts are preferable to be separately arranged adjacent to both side edges of the main groove bottom part in the steeply slant groove portion.

BRIEF DESCRIPTION OF THE DRAWINGS

The invention will be described with reference to the accompanying drawings, wherein:

FIG. 2A is a diagrammatically section view of a pseudo-land portion taken along a line I—I of FIG. 1;

FIG. 2B is a diagrammatically section view of the pseudo-land portion taken along a line II—II of FIG. 1;

FIG. 2C is a diagrammatically section view of the pseudo-land portion taken along a line III—III of FIG. 1;

DETAILED DESCRIPTION OF THE INVENTION

Figure 1:
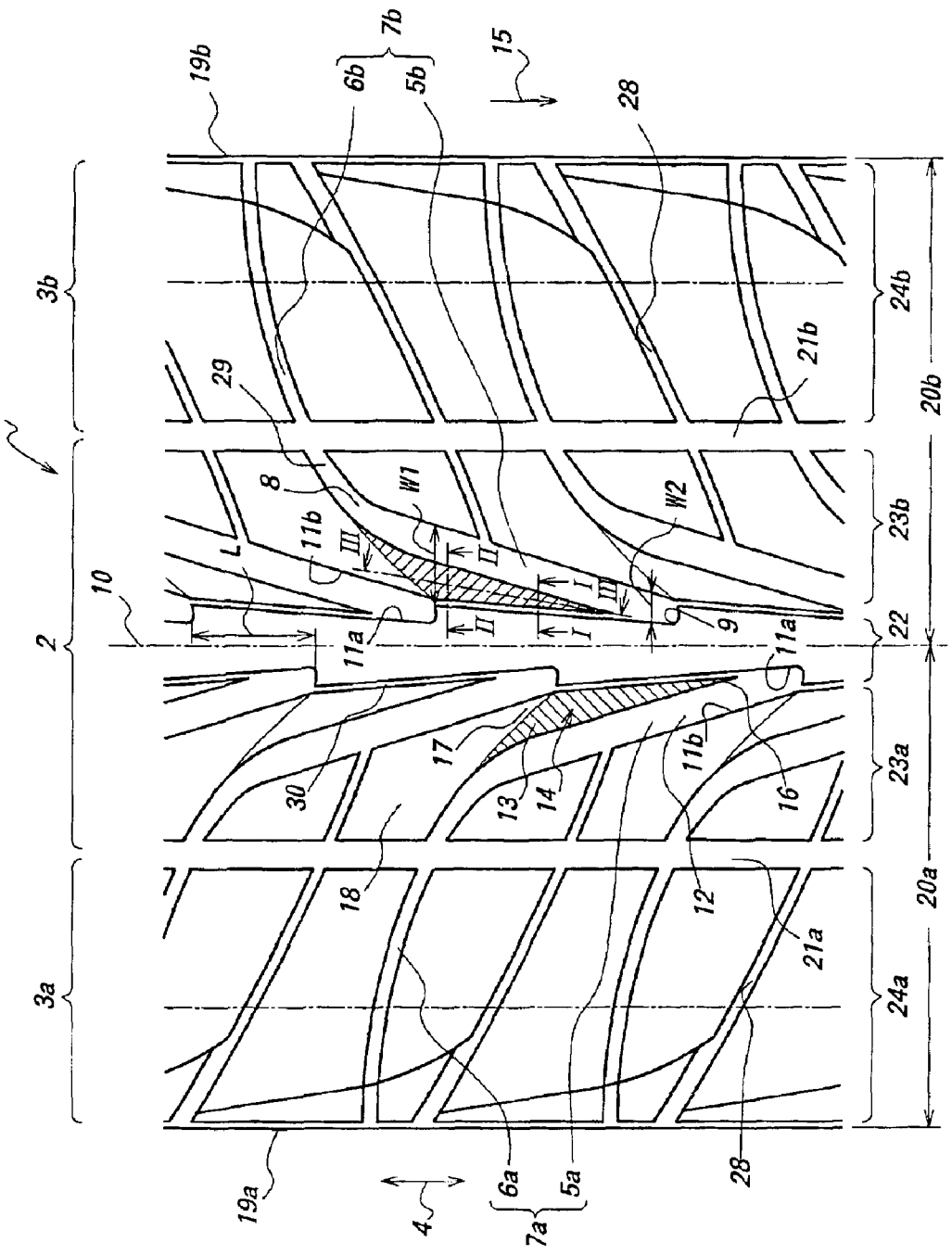
FIG. 1 is a partly developed view of a tread portion in an embodiment of the pneumatic tire according to the invention.

In FIG. 1 is partly shown a tread pattern formed on a tread portion in an embodiment of the pneumatic tire according to the invention, in which numeral 1 is a tread portion, numeral 2 a central region, numerals 3a and 3b side regions, numeral 4 a circumferential direction of the tire, numerals 5a and 5b steeply slant groove portions, numerals 6a and 6b gently slant groove portions, and numerals 7a and 7b slant grooves.

When the tread portion 1 of the tire shown in FIG. 1 is divided into the central region 2 and both side regions 3a, 3b, the tread portion 1 is provided with a plurality of slant grooves 7a, 7b comprising the steeply slant groove portions 5a, 5b located in the central region 2 and extending slantly at a relatively small angle, preferably an angle of no more than 30° with respect to the circumferential direction 4 of the tire, and the gently slant groove portions 6a, 6b located in the side region 3a, 3b and extending slantly at a relatively large angle, preferably an angle of 70–85° with respect to the circumferential direction 4 of the tire.

In the invention, an extending direction of the steeply slant groove portion 5a, 5b arranged in the central region 2 is constructed so as to substantially coincide with a flowing direction of water in the central region of the tread in the tire contacting with ground to thereby ensure the drainage performance, while the corner portions of the lands defined by the gently slant groove portions 6a, 6b arranged in the side regions 3a, 3b become obtuse to ensure the rigidity of the land, so that a good steering stability can be obtained.

However, the inventor has examined a possibility of further improving the drainage property with respect to the above tread pattern and obtained the following knowledge.

That is, it has been confirmed that when water existing in the central region of the tire contacting with ground is taken into the steeply slant groove portions 5a, 5b of the slant grooves 7a, 7b and moved to the gently slant groove portions 6a, 6b to discharge therefrom toward the lateral direction of the tire, if the groove width of the steeply slant groove portion 5a, 5b is made wider, water is easily taken into the steeply slant groove portion 5a, 5b, but the rigidity of the land becomes insufficient, and also water taken into the slant groove 7a, 7b collides with a groove wall of a curved groove portion 29 located between the steeply slant groove portion 5a, 5b and the gently slant groove portion 6a, 6b to easily cause the disturbance in the flowing of water, which largely lowers the drainage ability of the slant grooves 7a, 7b toward the lateral direction of the tire.

To this end, the inventor has made various studies in order to easily take water existing the central region of the tire contacting with ground into the steeply slant groove portions 5a, 5b without almost lowering the rigidity of the land and to smoothly move water from the steeply slant groove portions 5a, 5b to the gently slant groove portions 6a, 6b, and found that an opening groove width W1 located at the end 8 of the steeply slant groove portion 5a, 5b in the slant groove 7a, 7b is wider than an opening groove width W2 located at the top 9 of the steeply slant groove portion, and the steeply slant groove portion extending in a longitudinal direction of the slant groove comprises a groove edge part 31 forming a boundary to an outer surface 33 of a tread land portion, a main groove bottom part 32 mainly forming a groove bottom of the steeply slant groove portion, and a pseudo-land part 14 located in the groove edge part 31 and adjacent to at least one of both side edges 32a, 32b of the main groove bottom part 32, and the pseudo-land part 14 has such a slant surface 13 that a height thereof is gradually decreased from the groove edge part 31 toward the main groove bottom part 32. In other words, the pseudo-land part 14 having the slant surface 13 such that the height thereof is gradually decreased from the groove wall 11a toward the groove bottom 12 (more concretely, the main groove bottom part 32) may be formed in the steeply slant groove portion 5a, 5b of the slant groove 7a, 7b and at a position adjacent to at least one groove wall side thereof (the groove wall 11a near to a pattern center 10 in FIG. 1). As a result, the invention has been accomplished.

FIGS. 2A–2C show section views of the pseudo-land part 14 taken along lines I—I, II—II and III—III of FIG. 1, respectively.

As seen from the above, according to the invention, by adopting the above construction can be more improved the drainage performance without sacrificing the other tire performances such as steering stability and the like.

As another embodiment of the invention, the slant surface 13 of the pseudo-land part 14 has substantially a triangular or trapezoidal shape that a zone of the pseudo-land part 14 located at the top 9 of the steeply slant groove portion 5a, 5b, more concretely a zone 16 of the pseudo-land portion 14 located at a side first entering in a ground contact region during the rotation of the tire in an arrow direction 15 as shown in FIG. 1 is tapered. In this case, it is easy to smoothly flow water existing in the central region of the tire contacting with ground from the top 9 of the steeply slant groove portion 5a, 5b into the inside of the steeply slant groove portion 5a, 5b while strengthening the rigidity of a land adjacent to the pseudo-land part 14, particularly a land 18 having an acute zone 17 as shown in FIG. 1.

Moreover, FIG. 1 shows a case that in order to improve the ground contact property, a slit 30 is arranged between the pseudo-land part 14 and the groove wall 11a of the steeply slant groove portion 5a, 5b. Such a slit 30 can properly be arranged, if necessary.

And also, the slant surface 13 of the pseudo-land part 14 may have a flat shape or a curved shape.

Furthermore, when a pair of adjoining slant grooves 7a, 7b located on both sides of the pattern center 10 are arranged at a phase difference L of a half pitch in the circumferential direction 4 of the tire, the timing of the ground contact impact can be shifted between these slant grooves 7a, 7b located on both sides of the pattern center 10, whereby the pattern noise can be reduced.

Although FIG. 1 shows a case that the pattern center 10 coincides with the position of the equator of the tire, the pattern center 10 may be somewhat shifted from the position of the equator of the tire.

Moreover, when one circumferential main groove 21a, 21b extending along the circumferential direction 4 of the tire is arranged at a widthwise center position of each of tread half regions 20a, 20b sandwiched between the pattern center 10 and the tread ends 19a, 19b or in the vicinity of the center position of the tread half region, the drainage performance can be more enhanced while ensuring the rigidity of the land located in the central region 2 of the tread.

Also, it is preferable to form at least one rib-shaped land extending along the circumferential direction 4 of the tire, and at least two land rows each comprising a plurality of blocks and extending along the circumferential direction 4 of the tire on the tread portion 1, whereby the effect capable of simultaneously establishing the sufficient drainage performance and the steering stability is obtained. Moreover, FIG. 1 shows a case that three rows in total of a rib-shaped center land 22 and two medium land rows 23a, 23b located at both sides of the rib-shaped center land 22 are formed between the circumferential main grooves 21a, 21b (rib-shaped land is included in the conception of the land row), and two rows in total of side land rows 24a, 24b are formed respectively between each of the circumferential main groove 21a, 21b and each of the tread ends 19a, 19b. That is, five land rows in total are formed on the tread portion 1.

Figure 3:
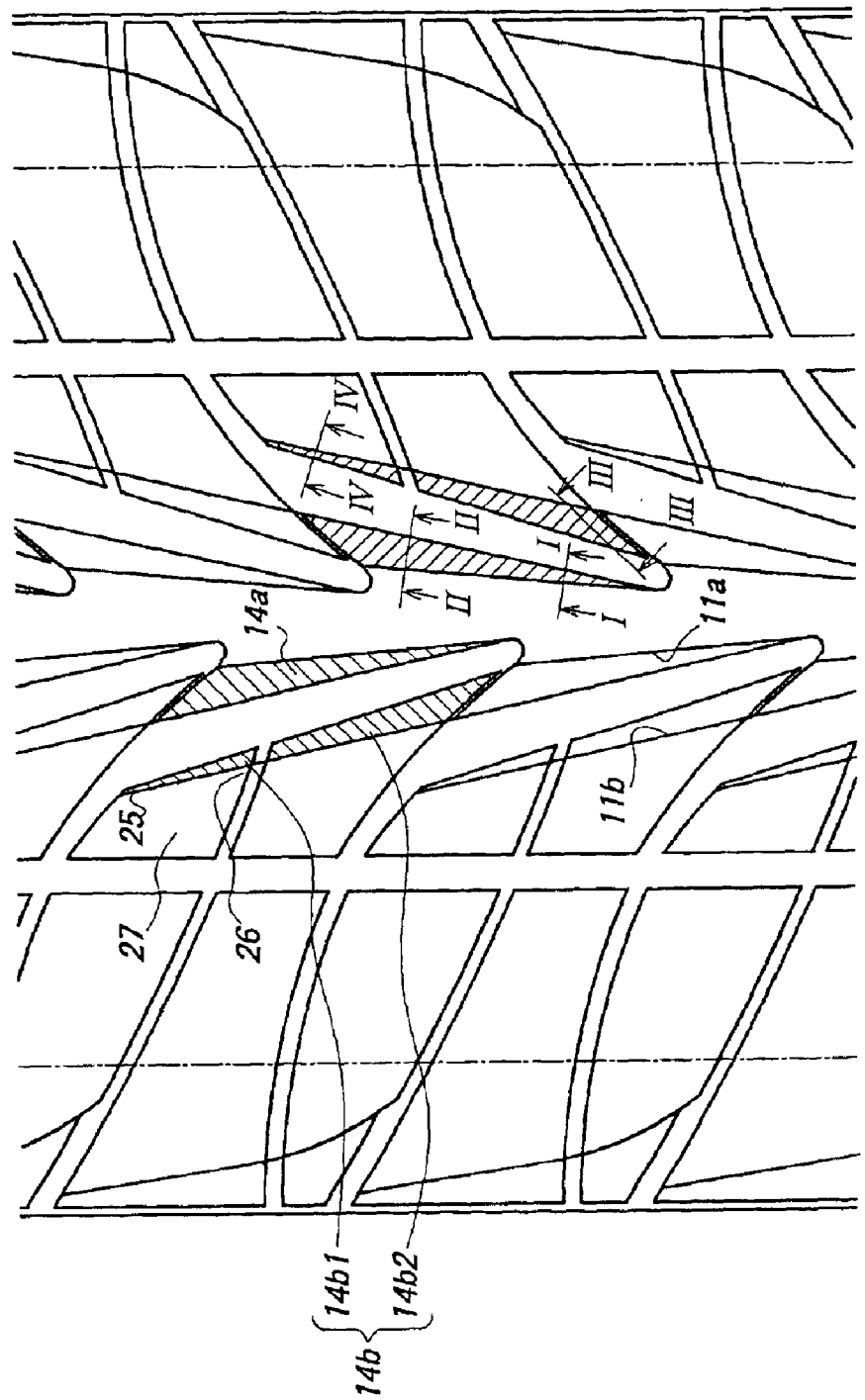
FIG. 3 is a partly developed view of a tread portion in another embodiment of the pneumatic tire according to the invention.
Figure 4A:
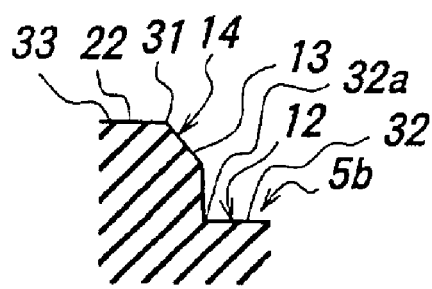
FIG. 4A is a diagrammatically section view of a pseudo-land portion taken along a line I—I of FIG. 3.
Figure 4B:
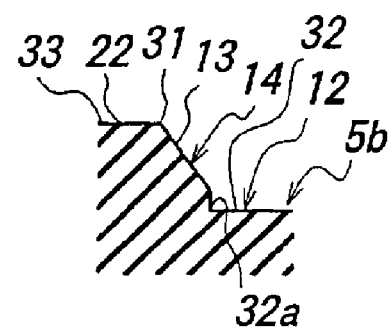
FIG. 4B is a diagrammatically section view of the pseudo-land portion taken along a line II—II of FIG. 3.
Figure 4C:
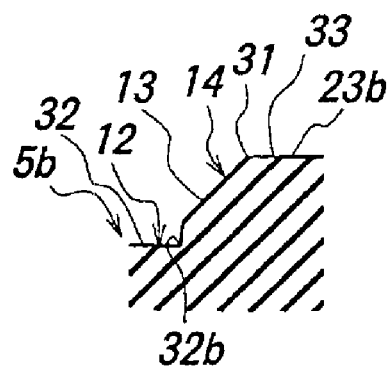
FIG. 4C is a diagrammatically section view of the pseudo-land portion taken along a line III—III of FIG. 3.
Figure 4D:
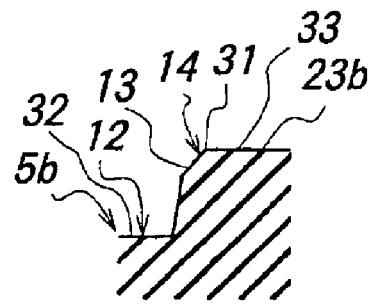
FIG. 4D is a diagrammatically section view of the pseudo-land portion taken along a line IV—IV of FIG. 3.

In addition, although FIG. 1 shows the case that the pseudo-land part 14 is arranged adjacent to the groove wall 11a located at the pattern-center-10-side of the steeply slant groove portion 5a, 5b, the pseudo-land parts 14a, 14b can be separately arranged adjacent to both groove walls 11a, 11b of the steeply slant groove portion 5a, 5b as shown in FIG. 3, respectively. In the latter case, water can rapidly be taken into the inside of the steeply slant groove portion 5a, 5b.

When the pseudo-land part 14b is arranged at the groove wall 11b of located at the tread-end-19a, 19b-side of the steeply slant groove portion 5a, 5b, as shown in FIG. 3, it is preferable that the pseudo-land part 14b is formed so as to have substantially a triangular shape or a trapezoidal shape that a zone 25 of the pseudo-land part 14b located at the end-8-side of the steeply slant groove portion 5a, 5b is tapered in view of strengthening the rigidity of a land 27 having an acute zone 26.

When it is required to more enhance the drainage performance, it is preferable to arrange a width-narrow circumferential sub-groove (not shown) extending along the circumferential direction 4 of the tire between the pattern center 10 and the circumferential main groove 21a, 21b. In case of arranging the circumferential sub-groove, in order to avoid the wandering such as rain groove or the like, it is favorable that when viewing the inside of the circumferential sub-groove toward the extending direction in the developed view of the whole of the tread portion constituting the tire, the sub-groove is constituted so as to have a groove shape that can not see through the whole of the inside of the sub-groove.

Although the above is described with respect to only a preferred embodiment of the invention, various modifications may be taken within a scope of the invention.

For example, as shown in FIG. 1, in order to more improve the drainage performance, an auxiliary groove 28 may be arranged between the gently slant groove portions 6a, 6a or 6b, 6b of the slant grooves 7a, 7a or 7b, 7b which are adjacent to each other in the circumferential direction 4 of the tire so as to extend from the groove wall located at the tread-end-side of the steeply slant groove portion in the slant groove and at the final ground contact side during the rotation of the tire in the arrow direction 15 through the circumferential main groove 21a, 21b up to open in the tread end 19a, 19b.

And also, it is favorable that a curved groove part 29 having a smooth curvature of connecting the steeply slant groove portion 5a, 5b to the gently slant groove portion 6a, 6b is formed in the slant groove 7a, 7b at a position ranging from the circumferential main groove 21a, 21b toward the pattern center 10 in view of the maintenance of the land rigidity, the prevention of the heel and toe wear in the land located in the side region 3a, 3b and the maintenance of the drainage performance toward the lateral direction of the tire.

Furthermore, the slant surface 13 of the pseudo-land part 14 may be inclined from a position of the height of the groove wall of the steeply slant groove portion 5a, 5b toward the groove bottom 12 as shown in FIGS. 4A–4D, or may be inclined from a position located inward from the above position of the groove wall height in the radial direction of the tire toward the groove bottom 12.

The following examples are given in illustration of the invention and are not intended as limitations thereof.

EXAMPLE 1

A tire of this example is a pneumatic tire having a tread pattern shown in FIG. 1 and a tire size of PSR 205/55R16 (tread width: 170 mm), in which dimensions of circumferential main grooves, slant grooves and the like are shown in Table 1. Moreover, the structure other than the tread portion of the tire is substantially the same as that of the conventional pneumatic tire usually used in a passenger car.

TABLE 1

| | Groove width (mm) | Groove depth (mm) | Groove angle*1 (°) |
|---|---|---|---|
| Circumferential main groove 21a, 21b | 7 | 8 | 0 |
| Steeply slant groove portion 5a, 5b | 10 | | 5–25 |
| Gently slant groove portion 6a, 6b | 4 | 6.5 | 70–80 |
| Auxiliary groove 28 | 2 | 6.5 | 70–65 |
| Curved part 29 | 6 | 8 – 6.5 | 25–70 |

TABLE 1-continued

|  | Groove width (mm) | Groove depth (mm) | Groove angle*1 (°) |
|---|---|---|---|
| Pseudo-land part 14 | Width of land: 8 – 0 mm, Length of land: 45–70 mm, Height of land: 8 – 0 mm | | |

*1:Angle with respect to the circumferential direction of tire

EXAMPLE 2

A tire of this example is a pneumatic tire having a tread pattern shown in FIG. 3 and a tire size of PSR 205/55R16 (tread width: 170 mm), in which dimensions of circumferential main grooves, slant grooves and the like are shown in Table 2. Moreover, the structure other than the tread portion of the tire is substantially the same as that of the conventional pneumatic tire usually used in a passenger car.

TABLE 2

|  | Groove width (mm) | Groove depth (mm) | Groove angle*1 (°) |
|---|---|---|---|
| Circumferential main groove 21a, 21b | 7 | 8 | 0 |
| Steeply slant groove portion 5a, 5b | 10 | 8 | 5–25 |
| Gently slant groove portion 6a, 6b | 4 | 6.5 | 70–80 |
| Auxiliary groove 28 | 2 | 6.5 | 70 – 65 |
| Curved part 29 | 6 | 8 – 6.5 | 25–70 |
| Pseudo-land part 14a | Width of land: 8 – 0 mm, Length of land: 55–70 mm, Height of land: 8 – 0 mm | | |
| Pseudo-land part 14b1 | Width of land: 3 – 1 mm, Length of land: 30 – 25 mm, Height of land: 8 – 0 mm | | |
| Pseudo-land part 14b2 | Width of land: 6 – 4 mm, Length of land: 35–45 mm, Height of land: 8 – 0 mm | | |

*1:Angle with respect to the circumferential direction of tire

Conventional Example

Figure 5:
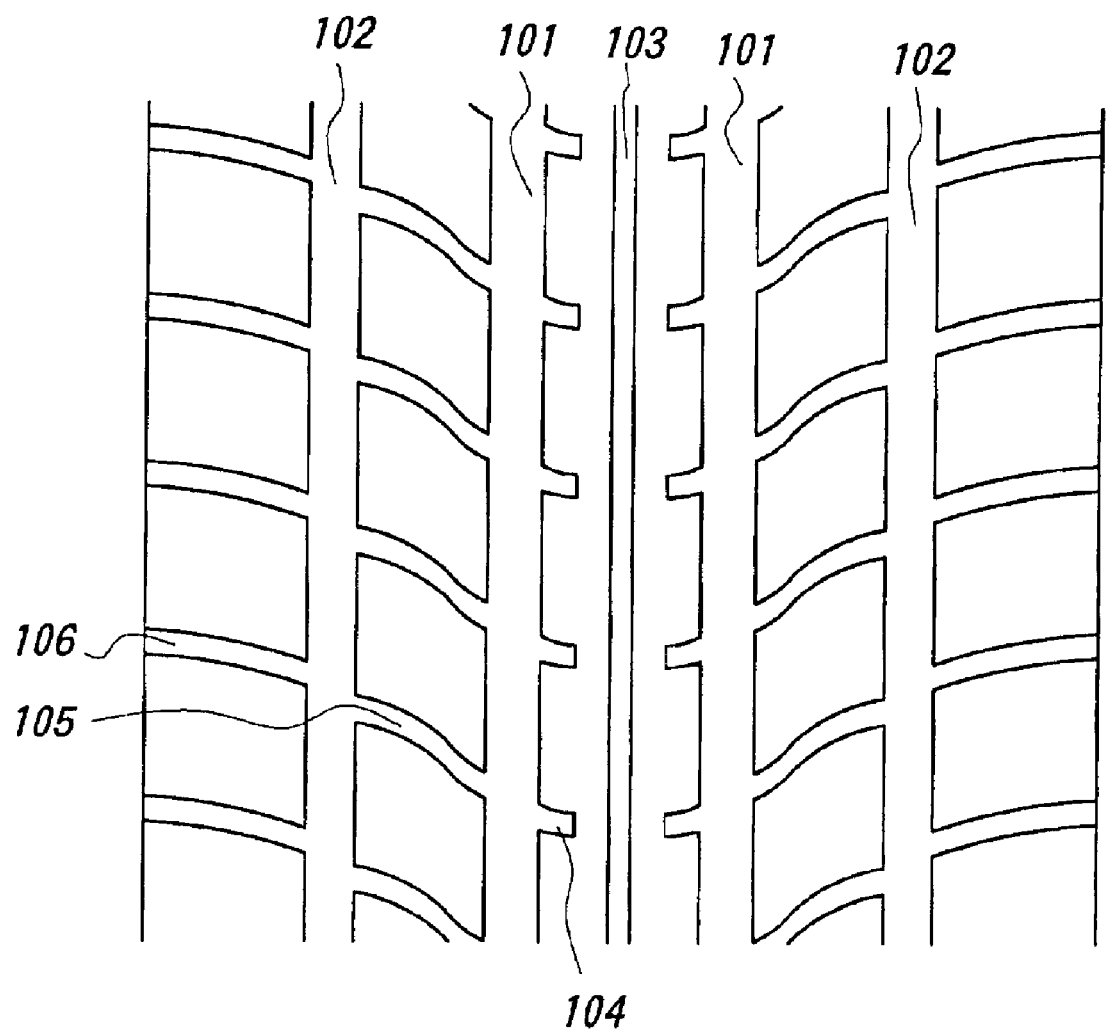
FIG. 5 is a partly developed view of a tread portion in the conventional pneumatic tire.

A tire of this example is a pneumatic tire having a tread pattern shown in FIG. 5 and a tire size of PSR 205/55R16, in which dimensions of circumferential grooves 101–103, slant grooves 104–106 and the like are shown in Table 3.

TABLE 3

|  | Groove width (mm) | Groove angle (°) | Groove depth (mm) |
|---|---|---|---|
| Circumferential groove 101 | 8 | 0 | 8 |
| Circumferential groove 102 | 7 | 0 | 8 |
| Circumferential groove 103 | 3 | 0 | 8 |
| Slantgroove 104 | 4 | 80 | 6.5 |
| Slantgroove 105 | 4.5–5.0 | 50–70 | 6.5 |
| Slant groove 106 | 5 | 75 | 6.5 |

Evaluation of tire performances

The drainage performance, steering stability and pattern noise are evaluated with respect to the above tires as follows.

Each of the above tires is mounted onto an approved rim (6×½ JJ) and subjected to the following tests under conditions that an internal pressure is 230 kPa and a load weight is the same as a weight when two crewman are ridden on the vehicle.

The drainage performance is evaluated during both the straight running and the cornering.

The drainage performance during the straight running is evaluated by straight running on a wet road surface having a water depth of 5 mm to measure a limit speed in the occurrence of hydroplaning phenomenon.

The drainage performance during the cornering is evaluated by running on a wet road surface having a water depth of 5 mm at a cornering radius of 80 m to measure a limit lateral G (gravity) in the occurrence of hydroplaning phenomenon.

The steering stability is evaluated by a feeling of a test driver when the vehicle is sport-run on a circuit course of a dry state at various running modes.

The pattern noise is evaluated by a feeling of a test driver on an indoor noise when the vehicle is run by inertia from 100 km/h on a straight and smooth road surface.

In Table 4 are shown these evaluation results, in which the numerical values in Table 4 are represented by an index on the basis that the conventional tire is 100. The larger the index value, the better the performance.

TABLE 4

|  | Conventional Example | Example 1 | Example 2 |
|---|---|---|---|
| Evaluation of performances | | | |
| Drainage performance *1 | 100 | 110 | 115 |
| Drainage performance *2 | 100 | 105 | 110 |
| Steering stability *3 | 100 | 105 | 100 |
| Pattern noise | 100 | 110 | 105 |

*1: During straight running
*2: During cornering
*3: During running on dry road surface As is seen from the results of Table 4, Examples 1 and 2 are excellent in the drainage performance and steering stability as compared with those of the conventional example and reduce the pattern noise.

According to the invention, there can be provided pneumatic tires, particularly high-performance tires improving the drainage performance without sacrificing the other tire performances such as steering stability and the like.

What is claimed is:

1. A pneumatic tire comprising a tread portion with a tread pattern defined by a plurality of slant grooves, each of which slant grooves comprising a steeply slant groove portion located in a widthwise central region of the tread portion, inclined at a relatively small angle with respect to a circumferential direction of the tire, and extending from a top that is one end of the steeply slant groove portion which is close to an equatorial plane of the tire toward an end that is the other end of the steeply slant groove portion which is close to a tread end, and a gently slant groove portion located in each of both side regions of the tread portion, inclined at a relatively large angle with respect to the circumferential direction of the tire, and extending from the end of the steeply slant groove portion or an extension thereof so as to open at the tread end, the improvement wherein:

an opening groove width (W1) located at the other end of the steeply slant groove portion is wider than an opening groove width (W2) located at the top of the steeply slant groove portion;

the steeply slant groove portion extending in a longitudinal direction of the slant groove comprises a groove edge part forming a boundary to an outer surface of a tread land portion, a main groove bottom part mainly forming a groove bottom of the steeply slant groove portion, and a pseudo-land part arranged in the steeply slant groove portion and extending along the groove edge part and adjacent to at least one of both side edges of the main groove bottom part, wherein the pseudo-land part is adapted to strengthen an acute zone of a tread land portion and to smoothly move water from the steeply slant groove portion to the gently slant groove portion;

the pseudo-land part is defined by a slant surface that a height thereof is gradually decreased in the tire widthwise direction from the groove edge part toward the main groove bottom part and is gradually decreased in the forward rotation direction of the tire toward the main groove bottom part;

the pseudo-land part is longer in the circumferential direction than it is wide in the tire widthwise direction; and the width of the pseudo-land part varies along its circumferential length.

2. A pneumatic tire according to claim 1, wherein the steeply slant groove portion of the slant groove extends at an angle of not more than 30° with respect to the circumferential direction of the tire.

3. A pneumatic tire according to claim 1, wherein the slant surface of the pseudo-land part has substantially a triangular shape or a trapezoidal shape when viewing the tire from a front thereof.

4. A pneumatic tire according to claim 1, wherein a pair of adjoining slant grooves located on both sides of a pattern center are formed at a phase difference of a half pitch in the circumferential direction of the tire.

5. A pneumatic tire according to claim 1, wherein one circumferential main groove extending along the circumferential direction of the tire is arranged at a widthwise center position of each tread half region defined between the pattern center and the tread end or arranged in the vicinity of the widthwise center position of the tread half region.

6. A pneumatic tire according to claim 1, wherein the gently slant groove portion of the slant groove extends at an angle of 70–85° with respect to the circumferential direction of the tire.

7. A pneumatic tire according to claim 1, wherein at least two land rows each comprised of plural blocks, which extend along the circumferential direction of the tire, are formed on the tread portion, the blocks comprising said tread land portion having said acute zone.

8. A pneumatic tire according to claim 1, wherein the pseudo-land part is arranged adjacent to a side edge of the main groove bottom part located at the pattern-center-side of the main groove bottom part in the steeply slant groove portion.

9. A pneumatic tire according to claim 1, further comprising a second pseudo-land part extending along the groove edge part and adjacent to the other one of said at least one of both side edges of the main groove bottom part in the steeply slant groove portion.

10. A pneumatic tire according to claim 8, further comprising a second pseudo-land part arranged adjacent to a side edge of the main groove bottom part located opposite to the pattern-center-side of the main groove bottom part in the steeply slant groove portion.

11. A pneumatic tire according to claim 1, wherein the pseudo-land part is spaced from a rib shaped land by a slit.

12. A pneumatic tire according to claim 1, wherein the slant surface of the pseudo-land part extends from the outer surface of the tread land portion to the groove bottom of the steeply slant groove portion.

13. A pneumatic tire according to claim 1, wherein the pseudo land part is formed in a triangle shape when the tread pattern is viewed in a plan view.

14. A pneumatic tire according to claim 13, wherein the triangle shape of the pseudo land part has a hypotenuse formed along the groove bottom of the steeply slant groove portion.

15. A pneumatic tire according to claim 1, wherein the width of the pseudo-land part narrows as the height of the pseudo-land part decreases.

16. In a pneumatic tire comprising a tread portion with a tread pattern defined by a plurality of slant grooves, each of which slant grooves comprising a steeply slant groove portion located in a widthwise central region of the tread portion, inclined at a relatively small angle with respect to a circumferential direction of the tire, and extending from a top that is one end of the steeply slant groove portion which is close to an equatorial plane of the tire toward an end that is the other end of the steeply slant groove portion which is close to a tread end, and a gently slant groove portion located in each of both side regions of the tread portion, inclined at a relatively large angle with respect to the circumferential direction of the tire, and extending from the end of the steeply slant groove portion or an extension thereof so as to open at the tread end, the improvement wherein:

an opening groove width (W1) located at the other end of the steeply slant groove portion is wider than an opening groove width (W2) located at the top of the steeply slant groove portion, and the steeply slant groove portion extending in a longitudinal direction of the slant groove comprises a groove edge part forming a boundary to an outer surface of a tread land portion, a main groove bottom part mainly forming a groove bottom of the steeply slant groove portion, and a pseudo-land part arranged in the steeply slant groove portion and extending along the groove edge part and adjacent to at least one of both side edges of the main groove bottom part so as to strengthen an acute zone of a tread land portion, and the pseudo-land part is defined by a slant surface that a height thereof is gradually decreased in the tire widthwise direction from the groove edge part toward the main groove bottom part, wherein the pseudo-land part is spaced from a rib shaped land by a slit.

* * * * *